United States Patent [19]

Mittal

[11] Patent Number: 5,629,874
[45] Date of Patent: May 13, 1997

[54] VEHICULAR TIRE AIR PRESSURIZATION SYSTEM AND METHOD

[75] Inventor: Chander P. Mittal, Rowand Heights, Calif.

[73] Assignee: CM Automotive Systems Inc., Walnut, Calif.

[21] Appl. No.: 401,088

[22] Filed: Mar. 8, 1995

[51] Int. Cl.$^6$ ................................................ G01N 11/08
[52] U.S. Cl. ............... 364/558; 364/506; 364/424.045; 152/415; 152/416; 152/417
[58] Field of Search ............................. 364/558, 506, 364/508, 426.02, 424.03, 424.05, 550, 551.01; 152/415–417; 137/224, 224.5, 227–229; 73/146.2–146.5; 141/38, 95, 197; 340/442–444

[56] References Cited

U.S. PATENT DOCUMENTS

| | | | |
|---|---|---|---|
| 4,782,878 | 11/1988 | Mittal | 152/417 |
| 4,862,938 | 9/1989 | Mittal | 152/417 |
| 5,244,027 | 9/1993 | Freigang | 137/224 |
| 5,313,995 | 5/1994 | Schultz | 152/416 |
| 5,327,346 | 7/1994 | Goodell | 364/426.02 |

*Primary Examiner*—Edward R. Cosimano
*Assistant Examiner*—Hal D. Wachsman
*Attorney, Agent, or Firm*—Derrick Michael Reid

[57] ABSTRACT

A vehicular tire air pressurization system having an intelligent controller is connected to one or more manifolds each connected to at least one set of tires with the controller for selecting current operation conditions and controlling the manifolds to maintain tire pressure at desire air pressures, the controller having non volatile memory for storing dynamic parameters used to control manifolds having inflation and deflation valves for pressurizing the sets of tires to the desired pressures subject to dynamic parameters which are field programmable and which may be updated after each pressure adjustment cycle so that the tires are efficiently pressurized to the desired pressures even during changing dynamic characteristics caused by changing conditions such as temperature, altitude and tire wear, the non volatile memory is also for storing operational data after installation to reselect operating functions and to reset operating parameters.

20 Claims, 8 Drawing Sheets

VEHICULAR TIRE AIR PRESSURIZATION SYSTEM AND METHOD

REFERENCE TO RELATED APPLICATIONS

The present invention is related to U.S. patent application Ser. No. 08/238,251 now U.S. Pat. No. 5,540,268, filed: May 4th 1994, entitled: Improved Method and Apparatus for Repeatable Adjustment of Tire Pressure, and is related to co-pending U.S. patent application Ser. No. 08/401,087, filed: Mar. 8, 1995, and entitled: Distributed Intelligence Vehicular Air Tire Pressurization System and Method.

FIELD OF THE INVENTION

The present invention relates generally to a method and apparatus for monitoring and controlling air pressure in pneumatic vehicle tires. More particularly, the invention concerns an improved apparatus for automatically controlling tire pressure in the field the operation of the system by programmable updating means for updating the inflating and deflating operations.

BACKGROUND OF THE INVENTION

Various types of systems have been used for controllably inflating and deflating vehicle tires during vehicle operation. Such systems typically include an air supply of pressurized air and controls for selectively increasing or decreasing an existing tire pressure, and for determining current tire pressures for each tire. The ability to selectively increase or decrease tire pressure is desirable in connection with optimizing the operation of the vehicle under widely changing conditions including weather, vehicular load, terrain, and vehicular speed.

A wheel valve tire air pressurization system is typically used for heavy vehicles having sets of tires pressurized thought respective manifolds and respective air channels. The wheel valve system has a wheel valve connected to each respective tire. The wheel valve is disposed in the air channel between an axle seal and the tires. The wheel valve can be shut off by air channel evacuation and thereby does not apply a continuous air pressure within the system through the axle seals leading to the tires. During the evacuation period when the wheel valve is shut off, the seal is not subject to air pressure. The lack of air pressure tends to extend the life of the axle air seal. The wheel valve system has one or more air manifolds each with a respective air channel connected to a respective set of wheel valves each set respectively connected to a set of tires. Each manifold controls the air flow through a respective channel which control a set of wheel valves and therefore controls the air pressure in a set of tires. Thus, a multiple manifold system can independently control multiple sets of tires, including for example, a set of front steering tires, a set of power drive tires, and a set of rear trailer tires. Each set of tires may have a respective desired tire pressure for a given traveling condition including speed, load and terrain. The use of multiple manifolds advantageously allows for simultaneous independent air pressurization adjustment of each set of tires. One programmed controller is used to control the tire pressure of the differing sets of tires. The wheel valve system has a cab mounted controller routing a cable of wires to each attached manifold.

One problem of prior system have included the inability to achieve inflation or deflation from one tire pressure to another with accuracy, and within a reasonable time period. It is desirable to provide a system which is efficient, minimizes operator involvement and obtains the required pressure accuracy within short inflating and deflating time periods. Complex flow control valves or valve orifice arrangements are not very effective to maintain and are undesirably expensive because small orifices tend to clog and are subjected to wear for reasons of high fluid velocities. Successful pressure monitoring systems are described in U.S. Pat. Nos. 4,782,878 and 5,309,969 both here incorporated by reference as there full set forth.

Prior art automatic control systems also suffer from a control problem called "hunting" when attempting to reach a desired set point tire pressure for a given operating condition. During a pressure inflation or deflation adjustment cycle, the system will either overshoot or undershoot the desired pressure generating wasteful repeated pressure adjustment cycles, before settling down to a stable pressure. Such systems produce long inflation and deflation times, inaccurate pressure adjustments and reduced reliability of operation. During an adjustment cycle, when dynamic pressure reaches the desired pressure, and the adjustment cycle is terminated, the air pressure may change to a stabilized static pressure which may not equal the desired pressure, which again, may cause the system to enter into another pressure adjustment cycle.

Prior systems also provide methods of eliminating hunting by shutting off the system in the dynamic closed loop operation with the use of pressure offset values to compensate for overshooting and undershooting and to provide a reduction in the inflation and deflation times. One problem associated with the prior system is the loss of pressure offset values when the system is turned off during vehicular parking. Another problem associated with the prior system are the errors in the offset corrections because the offset corrections do not compensate for the difference between the sensed pressures at the time of terminating the adjustment cycle and a subsequent stabilized static pressure. Yet another problem of the prior offset corrections is the use of constant offset values even during changing operating conditions which require changing offset correction values to maintain system performance.

Prior systems have also failed to address the need to conveniently change system operating functions and parameters especially useful during testing of experimental and newly designed vehicles and tires. Furthermore, air systems have been installed in a plurality of different vehicle models each having respectively desired operating functions and parameters disadvantageously requiring the manufacture of a respective plurality of unique systems or the manufacture of systems with dedicated additional, but unnecessary, model selecting switches. These and other disadvantages are solved or reduce using the present invention.

SUMMARY OF THE INVENTION

An object of the present invention is to provide a field programmable wheel valve tire air pressurization system for updating operating desired pressures, functions and parameters which may be individually selected and updated for improved operation.

An object of the present invention is to provide a field programmable wheel valve tire air pressurization system for controlling one of many different vehicle models each having respectively required different operating desired pressures, functions and parameters by storing respective blocks of desired pressures, functions and parameters all of which may be selected as a group for a particular vehicle model in which the system is installed.

Another object of the present invention is the use of dynamic offset values which are updated during inflation and deflation adjustment cycles to account for changing pressurization characteristics and which are used to control inflation and deflation adjustment cycles.

Another object of the present invention is to provide memory within an air pressurization system which may be updated with new data for controlling the system which will not lose stored data when power is removed from the system so that the system maintains current tire pressure operating desired pressures, functions and parameters even during vehicular restarting.

Another object of the present invention is the use of dynamic offset values which are updated after pressure adjustment cycles to account for changing pressurization characteristics and which are used to control inflation and deflation adjustment cycles.

Another object of the present invention is a tire air pressurization system using time delays after termination of a pressure adjustment cycle when the system measures stabilized static pressures to controllably maintain desired pressures.

The system is an improved wheel value air tire pressurization system with new features and aspects. In one aspect of the invention, the air tire pressurization system is improved by field programmability. The air tire pressurization system is modified with means on a controller front panel for reprogramming the system when in field use well after initial installment. The system includes a cab mounted controller connected to and controlling one or more tire air pressurizing manifolds each of which distribute pressurized air to a respective set of vehicular tires. The system maintains the air pressure of the tires within predetermined air pressure bands based upon current operating conditions, functions and parameters. The air pressure is periodically adjusted to maintain proper air pressure over dynamic operating conditions. The cab mounted controller has a front panel with buttons and switches which enable an operator of the system to reselect operating conditions, reprogram preselected programmed functions and reprogram preset parameters. The ability to reprogram functions and parameters is particularly useful during initial vehicular testing procedures.

In yet another aspect of the invention, the controller uses on board memory to store offsets in look up tables used to enhance the control of inflation deflation cycles to prevent over shoot and under shoot. The offsets are used to adjust desired pressures to target pressures which are used during dynamic pressure adjustment cycles to prefect an absolute shut off during closed loop pressure sensing. The air pressure offsets with an absolute shut off operates to prevent hunting. After the pressure adjustment cycles, the offsets are recomputed to then account for any dynamic changes in system characteristics. The offsets are used to control enhanced pressure adjustment of the tire pressures to maintain the desired pressures.

In another aspect of the invention, offset values dynamically updated and used to maintain tire pressures to the desired pressures. During the course of operation, the system stores desired tire pressures referenced to selected operating conditions. Before a pressure adjustment cycle, the system adjusts desired pressures with the offsets resulting in target pressures. During a pressure adjustment cycle, the system monitors the dynamic air pressure through a transducer and terminates the adjustment cycle when the sensed dynamic air pressure equals the target pressure. After the adjustment cycle, the system then delays to enable the tire pressure to stabilize to a static pressure. After stabilization of the tire pressure, the system senses the static tire pressure. The system compares the resulting static pressure to the target pressure, and updates the offset values, so that on the next adjustment cycle, the static pressure will be equal to the desired pressure. The air pressure is periodically adjusted to maintain proper air pressure over dynamic operating conditions. In this manner, the system maintain dynamic offset pressure values which compensate for to dynamic vehicular operating characteristics.

The system is characterized has having an absolute shut off after the pressurization adjustment cycles so as to prevent hunting associated with overshooting and undershooting, while adjusting system performance in the face of ever changing dynamic characteristics resulting from changing conditions, such as temperature, altitude, tire wear and air channel performance, to maintain proper tire desired air pressure over the life of the system.

The present invention uses a large deflation exhaust orifice for rapid deflation reducing the problem of debris clogging, uses an absolute shut off method to avoid hunting, uses time delay measurements to avoid the problems of voltage transients affecting the inflation and deflation cycles and to measure static pressures for improved operations, and uses stored offsets which are dynamically adjusted over time to maintain desired pressures even when the system is subjected to dynamic changing conditions.

In yet another aspect of the invention, selected functions, operating parameters, and dynamic updated offset values are stored in an erasable programmable ROM which stores data even when the vehicle is turned off during parking when power is removed from the controller of the system. Reprogrammed functions, parameters and updated offset values are not lost when power is removed so that reprogrammed functions and parameters, which enable improved operating performance, are available for immediate used by the system upon a restart.

In yet another aspect of the invention, the intelligent controller uses on board memory to store offsets in a look up table. The offsets are used to enhance the control of inflation deflation adjustment cycles to prevent over shoot and under shoot. The offsets are added to desired pressures resulting in target pressures which are used during pressure adjustment cycles to prefect an absolute shut off during closed loop pressure sensing. The air pressure offsets with an absolute shut off operates to prevent hunting. After a pressure adjustment cycle, the offsets are recomputed and then account for dynamic changes in system characteristics. The offsets are used to control the adjustment cycle to maintain the tire pressures to the desired pressures. During the course of operation, the system stores desired pressures based upon selected operating conditions. Before a pressure adjustment cycle, the system adds offset values to desired pressures resulting in target pressures. During a pressure adjustment cycle, the system monitors the air pressure through a transducer and terminates the cycle when the monitored air pressure equals the target pressure. After the adjustment cycle, the system then delays to enable the tire pressure to stabilize to a static pressure, after which the system senses a static tire pressure. The system recomputes the offsets so that on the next pressurization adjustment cycle, the static pressure will equal the desired pressure. In this manner, the system maintains dynamic offset values in response to dynamic changing vehicular characteristics, such as temperature, altitude, wear and air channel performance. The system is characterized has having an absolute shut off after the pressurization adjustment cycle so as to prevent hunting associated with overshooting and undershooting, while adjusting the system performance in the face of ever changing dynamic operating characteristic caused by changing conditions, such as temperature, altitude and tire wear to maintain proper tire desired air pressure over the life of the system.

In another aspect of the invention, a multiple channel air system and a single manifold are used in combination with a gating means to route air pressure from the manifold to one of a plurality of air channels. These and other advantages will become more apparent from the following detailed description of the preferred embodiment.

DETAILED DESCRIPTION OF THE PREFERRED EMBODIMENT

Figure 1:
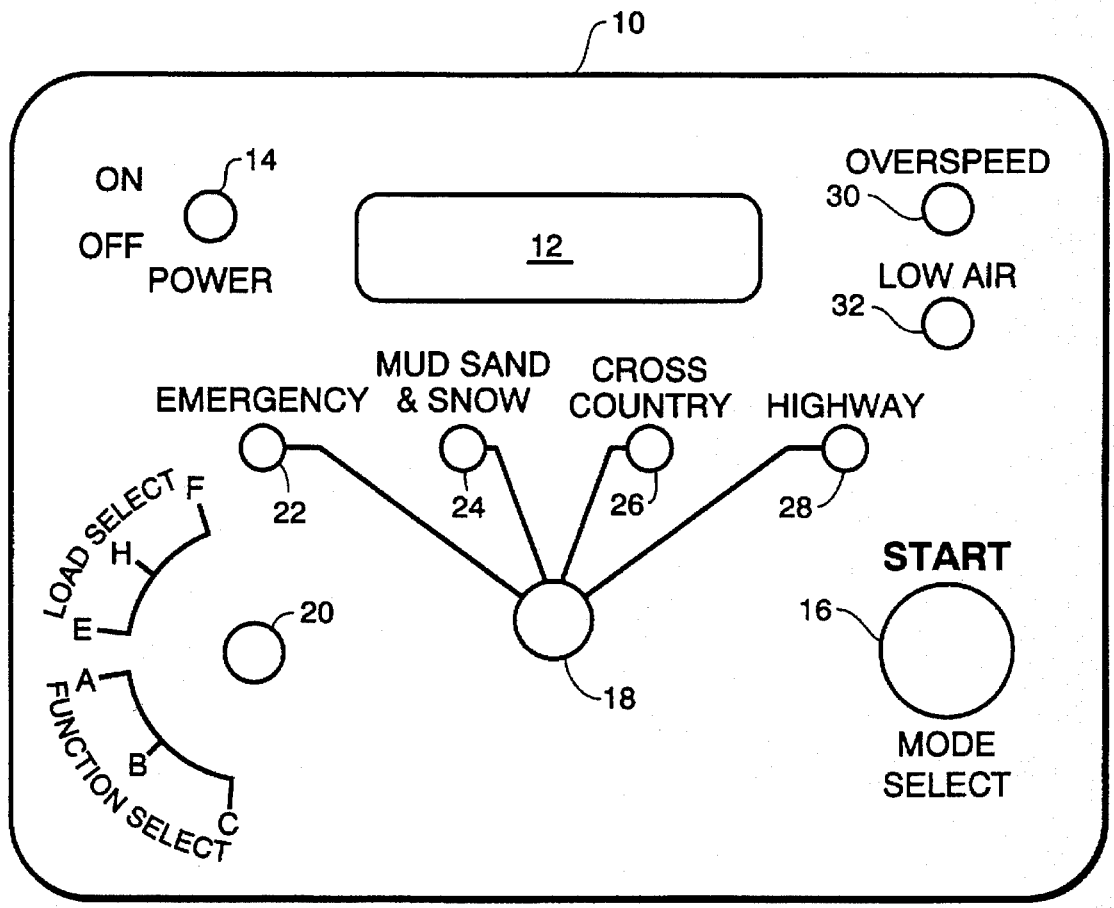
FIG. 1 is a diagrammatic view of a programmable cab-mounted control panel of a cab mounted controller of an air pressurization system for controlling the air pressure of vehicular tires.
Figure 2:
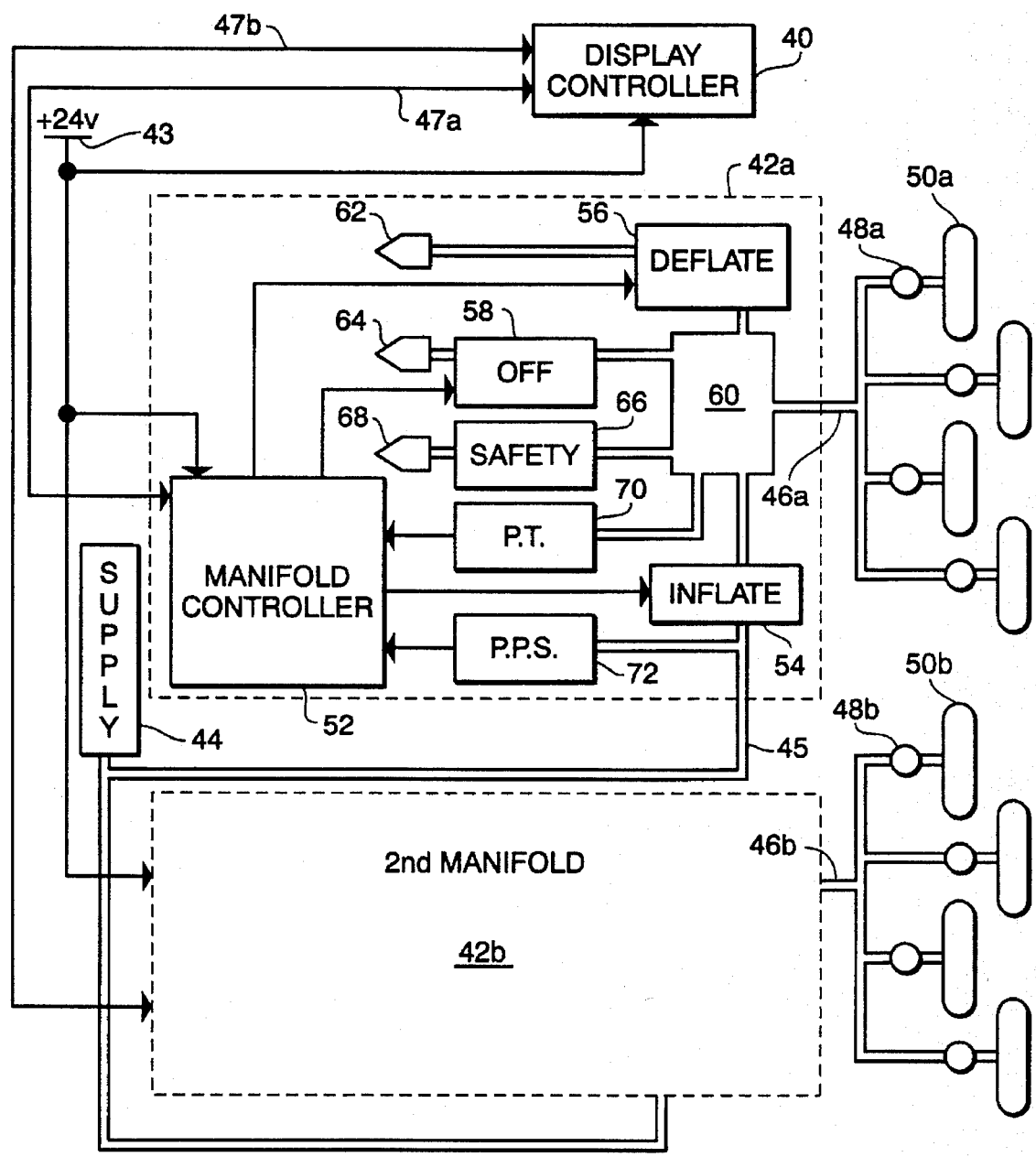
FIG. 2 is a block diagram of a air pressurization system.

The present invention is discussed in reference to the Figures. Referring to FIG. 1 and 2, an air pressure system of the present invention preferably has an operator panel 10 as an operator control means. The panel preferably has a display 12, a power switch 14 having on and off positions, 86, a start mode select button 16, a terrain select rotary switch 18, a load select rotary switch 20, a plurality of signal lights 22, 24, 26, 28, 30 and 32 indicating status and operating conditions that can be selected by the operator. Preferably, the terrain select rotary switch has four positions Emergency, Mud Sand & Snow, Cross Country and Highway, with respective LED indicators 22, 24, 26 and 28. The load select switch 20 has preferably three load level position, Empty, Half and Full. The load select switch also has a plurality of function select positions as shown used for system field programmability. While the panel is shown is a preferred form, other combination of switches, buttons, indicators and display could be used as well.

The panel 10 functions as an input means to direct the accomplishment of one or more of the operational sequences. By rotating the terrain rotary switch 18 and load rotary switch 20, the operator can select desired tire pressures which correspond to the selected vehicular operating conditions including terrains and load. The operating conditions are selected by one of the terrain position, highway indicated by LED 28, cross-country indicated by LED 26, mud sand & snow indicated by LED 24 and emergency indicated by LED 22 and are selected by one of the load positions, empty load as shown, half load as shown, and full load as shown. By selecting one of the terrain and load operating conditions, the operator selects the desired tire pressure. A vehicle may have sets of tires each having a respective set desire tire pressures for each operating condition. Traction in various terrain is in direct proportion to the amount of rubber tire in contact with the ground also known as tire foot print. For a given terrain, a varying load easily changes this foot print. If a single desired pressure is used for a given terrain, it can only provide the maximum traction for a given load, for example, a full load. As the load is reduced to half, or to empty, the traction will be reduced if the same tire pressure is maintained. Thus, a desired pressure for each terrain should be adjusted by the load condition. Therefore, the combination of the two switches 20 and 18 represents one of the twelve desired tire pressures available, for each set of tires, representing both the terrain and load operating conditions.

The system also monitors the speed of the vehicle. Each desired pressure has a safe vehicle operating speed. If the vehicular speed exceeds the safe speed the LED 30 is blinked. If the vehicular speed exceeds the safe for predetermined time period, for example, one minute, the over speed LED 30 is flashed. If the over speed condition continues for another predetermined time period, the system may automatically adjust the tire pressure corresponding to the increased speed. One of the four LEDs 22, 24 26 or 28 representing the next higher pressure and speed operating condition will start blinking and the system will inflate all tires to the next higher desired pressure and will then turn off the over speed LED 30.

Referring to FIGS. 1 and 2, the air pressure system of the present invention includes a controller 40 shown in one preferred form, connected to two manifolds 42a and 42b. The air systems can be adapted to support several manifolds 42, though each system must have at least one manifold 42a. The controller 40 operably interfaces with the panel 10 operator control means. The cab mounted controller 40 is used to control air manifolds 42 to regulate the tire air pressure by controlling the operation of the manifolds 42. Operational control of system lies in the controller 40 having panels controls and indicators as shown in FIG. 1. The manifolds 42 and controller 40 receive electrical power from a vehicular 24V battery supply 43. The manifolds 42 supply pressurized air from an air source 44 through a supply conduit 45 into one of three air channels 46a and 46b. The manifold 42a and 42b supply pressurized air from the air source 44 through the supply conduit 45 into preferably two respective air channels 46a and 46b. The controller 40 is operably connected to manifolds 42a and 42b over respective cables 47a and 47b to respectively control the air pressure in the air channels 46a and 46b. The cables 47 comprise wires for communicating control signals to the manifold and for receiving sensor outputs operated by regulated power source within the manifold 42 which preferably communicates available regulated power to the controller 40. The cable 47a extends from controller 40 to the first manifold 42a. The second cable 47b extends from the controller 40 to the second manifold 42b. Each of the air channels 46a and 46b is connected through a respective set of wheel valves 48a and 48b, with only one wheel valve in each set referenced designated as such, and to a respective channel set of tires 50a and 50b, with only one tire in each set referenced designated as such. With the use of a third and fourth manifold, not shown, a third and fourth cable, not shown, would be respectively connected between the third manifold and the fourth manifold having a respective air channel, set of wheel valves, and set of tires, all also not shown. The preferred system has two manifolds 42a and 42b for air pressurization of two respective sets of tires 50a and 50b which may pressure adjusted at the same time by simultaneously operation of manifolds 42. Each manifold 42 can be operated independently of the other to adjust tire pressures in differing respective air channels 46 at the same time.

The controller 40 uses stored microcomputer programs to control the manifolds 42 to adjust the tire air pressure. Each of the manifolds 42 electronically interacts with the controller 40 to control the air pressure of the air channels 46a and 46b having respective sets of wheel valves 48a and 48b, and respective sets of tires 50a and 50b. Each manifold 42a and 42b has a manifold electronic circuit 52 controlling the operation of an inflation valve 54 for increasing the tire air pressure, a deflation valve 56 for decreasing the tire air pressure, and a shut off valve 58 for closing wheel valves 48 to stabilize the tire air pressure. The valves 52, 54 and 56 vary the air pressure in a central cavity 60 and air channels 46 connected to the valves 54, 56 and 58.

The inflation valve 54, when activated, communicates air under a high air pressure from the air supply 44 through the conduit 45 into the cavity 60 through the air channels 46 to inflate the tires 50 through the wheel valves 48. Electronic modulation of the inflation valve 54 can be used to control the inflation rate.

The deflation valve 56, when activated, communicates air under a lower air pressure from the cavity 60 to atmosphere through a deflation exhaust orifice 62 functioning to limit the rate of decrease the air pressure in the cavity 60 during deflation of the tires 50 through the wheel valves 48. This rate can also be affected by variable orifice sizes where the flow can be regulated to have increased flow at higher pressure and normal flow at lower pressure. Electronic modulation of the deflation valve 56 can be used control deflation exhaustion air flow rates to atmosphere. The overall effect of the modulation of deflation valve 56 is to reduce the total deflation time for each tire pressure adjustment cycle to accommodate only one size orifice 62.

The shut off valve 58, when activated, communicates air under a very low pressure to atmosphere through a larger shut off exhaust orifice 64 functioning to quickly lower the air pressure in the cavity 60 and the connected air channel 46 to shut off the connected air pressure activated wheel valves 48 to stabilize the tire pressure in the tires 50. The shut off valve 58 is energized into an open position which produces a rapid decay of pressure in the cavity 60 and connected air channel 46 causing the wheel valve 48 to close. The orifice 64 is typically large to permit rapid evacuation of the air channel 46 and permit the ejection of debris that might otherwise clog the wheel valve 48, air channel 46 and cavity 60.

A safety valve 68 opens to communicate air to atmosphere through a safety orifice 66 when the air pressure of the cavity 60 exceed a predetermined valve. The safety valve 68 is preferably a spring loaded ball pressure fit valve communicating air to the orifice 66 for exhaust.

The manifold electronics 52 communicates to the controller 40 signals from a pressure transducer 70 and a priority pressure switch 72 for operational control. The pressure transducer 70 communicates an electronic signal indicating the air pressure of the cavity 60 to the manifold electronics 52. The priority pressure switch 72 is a pressure transducer which communicates a low air supply signal through the manifold electronics 52 to the controller 40. The pressure transducer 70 provides a voltage signal to the controller 40 indicating the air pressure of the cavity 60. The priority pressure switch 72 is in either an on or off state indicating when the supply air pressure in conduit 45 is below a predetermined value, for example, eighty PSI so that the controller 40 will not activate the inflation valve 54 to conserve the air supply giving priority to other systems, such as an air brake system, not shown, which may also drain air for the supply 44. The first manifold 42a is different than the remaining manifolds, for example, the second manifold 42b, by the use of the priority pressure switch 72 for providing a low air signal. Only one priority pressure switch 72 is needed and is preferably placed in the first manifold 42a.

The second manifold 42b would preferably not a have a redundant priority pressure switch 72. The priority pressure switch 72 could also be an analog measuring transducer like the pressure transducer 70. The priority pressure switch 72 could also be directly connected to the shut off valve 58 to turn off the wheel valve 48 to stabilized the tire air pressure and also be directly connected to the inflation valve 54 to disable the inflation valve 54 preventing additional drain of the air supply 44 during a low pressure condition of the air supply 44 as sensed in the conduit 45. The pressure priority switch 72 functions to continuously monitor the air supply 44. When the supply pressure drops and an inflation adjustment cycle begins, the system may completely turn off the inflation valve 54 or may modulate the inflation valve 54, in either case to reduce inflation air flow to maintain a minimum air supply pressure, for example, eighty PSI, and to conserve the air supply 44. The flow characteristics of typical compressors of the air supply 44 allows for a minimum air drain and modulating the inflation air flow to reduce the frequency of shut off operations achieves reduced inflation times under low air supply pressures.

The first manifold 42a could further include a gating means, not shown, connected between the cavity 60 and a plurality of air channels 46, and controlled by controller 40 through the manifold electronics 52. The gating means would route cavity air pressure to each set of tires, one at a time. The gating means would be used to reduce the number of manifolds to one, but would then prevent simultaneous pressure adjustment of the various sets of tires 50.

Referring to FIGS. 1, 2 and particularly 3, the controller 40 includes a microprocessor 80 driven by an oscillator 82 and is reset by a reset circuit 84. The oscillator preferably operates at 3.6864 MHz, though other frequencies could be used. The reset circuit 84 provides a reset pulse for a reset time period after the application of vehicular ignition power. The reset circuit 84 could be a MC33064P device. Microprocessor 80 could be a 68HC11F1 device. Upon reset, the microprocessor 80 executes microcode software programs loaded into an EPROM 86 using address lines 88 and data lines 90. The EPROM 86 is a non volatile memory such as a 27C256 EPROM. The memory 86 is preferably a non volatile memory which can be altered with new data during operational use. The memory 86 stores updated data which is not loss when power is removed. When power is removed, the data in EPROM 118 is not lost but can be used again during the next operational use of the vehicle. The EPROM 86 stores the operational programs for operating the system and is easily programmable in the field with new functions and parameters values which are loaded into the memory 86. The preferred microprocessor 80 has both analog inputs and digital inputs and outputs. The microprocessor 80 also has control lines not shown, such has read, write, and chip select control signals. Those skilled in the art of microprocessor design are familiar with the use of such control lines. Those skilled in the art of microprocessor design are familiar with equivalent designs such as using internal microprocessor memory, not shown, for temporarily storing current operating data.

The EPROM 86 stores current operating data which may be updated. The EPROM 86 stores a group of current desired pressures, for example, twenty four pressures for four terrains, for three loads, and for two air channels, which may be stored in a look up table. The desired pressures preferably have corresponding speed limit values which may also be stored in similarly organized speed look up table. The desired pressure and speed value may be updated in the field. Field programmability uses the display buttons and indicators to change the operating data including, desired pressures and speeds values for the respective terrain and load operating condition and air channel, and includes operating functions, functions timers and parameters. This programmability is particularly useful for testing tire performance over various speeds, pressures, loads, terrains, vehicles, operating functions, and parameters. For example, the system can be field programmed to disable an over speed detection function and to disable over speed increment function for disabling the automatic adjustment of desired pressures so that the tires 50 can be stress during continuous over speed testing operation. This could facilitates tire testing by a tire or vehicle manufacturer.

The EPROM 86 also stores operating data in groups each of which represents a complete operational definition and control of the system including desired pressures, speeds values, functions, timers and parameters. Each group of values are field selectable and programmable using a front panel switches and buttons under processor control for scrolling and displaying selected options and values. Each group of values may be assigned a vehicular model number the operator can conveniently select all of the operating data for a particular in which the system is installed and so that one controller could be used in a wide variety of vehicles each having an assigned stored group of operating data. Each group would define the number of manifolds and air channels. This vehicular model selection of operating data feature eliminates the need to manufacture a number of controllers necessary to control different types of vehicles for manufacturing cost savings. Thus, one field programmable controller could be installed in many types of all terrain air pressurized vehicles having different operating data requirements.

The EEPROM 86 is connected to data lines 90 for reading and writing data. The data lines 90 are also connected to an LED register 92 and the LCD display 12. The LED register 92 has individual data bits on lines 94 which is used to respectively activate LEDs 22, 24, 26, 28, 30 and 32 of the panel 10. The LCD display 12 has a contrast control 96 which is set by an internal potentiometer, not shown.

The controller 40 may be uniquely adapted for military applications where there is a need to turn off all lights yet remain in operation. The controller 40 may have a Black Out input 96 which is connected to the LED register 94 to disable the output of the register 94 so as to turn off all the LEDs on the panel 10. The controller 40 may further include self testing circuits, not shown, which may, for example, sense the outputs of the register 94 to determine if the LEDs are turn on when the respective bits of register 94 are appropriately set.

The controller 40 includes a valve gating register 98 which is used for selectively activate power FET transistors, not shown, in a first valve driver 100a and a second valve driver 100b. In the preferred form, the number of drivers 100 is equal the number of manifolds 42. Preferably the controller 40 has two drivers 100a and 100b for two respective manifolds 42a and 42b, but addition drivers, not shown, could be used to support additional manifolds. The valve register 98 could be a 74HC259N device gating means. The valve drivers 100 are used for sinking current from to the manifolds 42 for controlling solenoids operation in the inflation valves 54, the deflation valves 56 and the shut off valves 64. In the preferred form of the invention, address lines 88 are used to control the valve register 98, but a combination of the data lines and address lines could be used as well. The valve register 98 uses address lines 88 to address one of six data bits, and uses another one of address lines 88 as a data bid line, so that each bit, that is each of the six power FETs in the valve drivers 100 and 102 may be independently turned on and off so as to respectively independently control the actuation of the six solenoids.

Vehicular 24V battery ignition power 43 is routed through switch 14 of the panel 10 over line 102 to an EMI filter 104 which supplies filtered 24V power on lines 106a and 106b. The EMI filter 104 could include an input rectifying diode in series with 250 uh choke inductor, both not shown, connected to input line 102 and connected to a filter comprising parallel connected 450 uf capacitor, 10K ohm resistor and a 33V zenner diode, all not shown, but well understood by those skilled in the art. The 24V signal on line 106a is sensed by microprocessor 80 which may determine a low battery condition. Battery chassis ground is connected on line 108. In the preferred form of the invention, battery 24V power 34 on line 102 is directly routed to the manifold 42 to supply power to the six valve solenoids of the manifolds 42. In an alternate form, the 24V filter power 34 may be routed to the six valve solenoids, not shown, through lines 106. In either case, the valve drivers 100 are connected to chassis ground 108 for sinking current flowing through the power line 106 or from the batter power 34 through the manifolds 42 for controlling the valves 54, 56 and 58.

An auxiliary driver 110 is optionally used to control auxiliary external devices, not shown, such as a means for engaging four wheel drive which may be activated by an electronic signal. The auxiliary driver 110 may include power FETs selectively activated by the microprocessor 86 or other data register, not shown, over lines 112. The FETs of the driver 110 are also preferably for sinking driver current which may cause actuation of external solenoids within the auxiliary device, not shown. Microcode programs functions could, for example, engage four wheel drive when ever the emergency terrain is selected on the front panel.

Terrain select lines 114, load & function select lines 116 and start line 118 are routed to the microprocessor 86 from the panel 10 for operation control. The start mode button 16 on the panel 10 of the controller 40 provides a digital signal. The load function select rotary switch 20 provides a respective digital signal for each load position, empty, load half, load full, function A, function B and function C positions, only one of which lines 116 is active depending on the position of switch 20. Terrain rotary switch 18 provides a digital signal for each position emergency, mud sand & snow, cross country and highway, only one of which lines 118 is active depending on the position of switch 18. Start Mode button 16 is used for operation control for selecting field programmable options. During field programming, the function position A, B and C are used in combination with start mode button 16 to scroll through programmable options and incrementing values.

The filtered 24V signal on line 106 is routed to the manifolds 42 for actuating the valves 54, 56 and 58, but is also used within the manifolds 42a and 42b, to respectively generate regulated first and second 15V supply signals which are respectively routed back to the controller 40 over cables 47a and 47b on lines 120a and 120b, further respectively connected to rectifying diode diodes 122a and 122b. The actual voltage on line 120 may drop to as low as 13V because of diode, regulated output and line loses. The diodes 122 are hard wired together and connected to a 15V regulator 124 and a 5V voltage regulator 126, respectively providing a 5V source on line 128 and a 15V source one line 128 which may be as low as 12V volts. The 15V regulator 124 may be a LP2950A device. The 5V regulator 126 may be an LM7805 device. The microprocessor 80 can monitor lines 106a, 120a, 120b, 128 and 130 to determine if proper power supply voltage levels are provided. The 5V signal on line 130 which is routed to at least devices 80, 84, 92, 86, 98 and 96 for supplying power.

The priority pressure switch 72 in the first manifold 42a provides the low air signal on line 132. The low air signal on line 132 is an active high signal. A first pressure transducer signal on line 134 from the manifold 42a in cable 47a, and a second pressure transducer signal on line 136 from the manifold 42b in cable 47b are sensed by the microprocessor 80. A speed buffer circuit 138 preferably receives a sinusoidal signal over lines 140a and 140b originating from a vehicular speed transducer, not shown. The buffer circuit 138 is preferably a zero volt cross over detection circuit using the +15V power source on line 128 to convert the sinusoidal speed signal into a modulated square wave signal on line 142 suitable for sensing by the microprocessor 80 for vehicular speed determination. In an optional form of the invention, a load level signal on a load level line 144 could be used by the processor 80 to sense the current vehicular load where the vehicle is equipped with a load level sensor, not shown. Such a load signal could be used to verify operator load selection or used to set the current load levels. The load signal could also be used to automatically adjust desired pressures as the vehicular load level changes. The load level signal may require a load level buffer circuit, not shown, to scale or reformat the load signal on line 144 suitable for microprocessor sensing.

Figure 3:
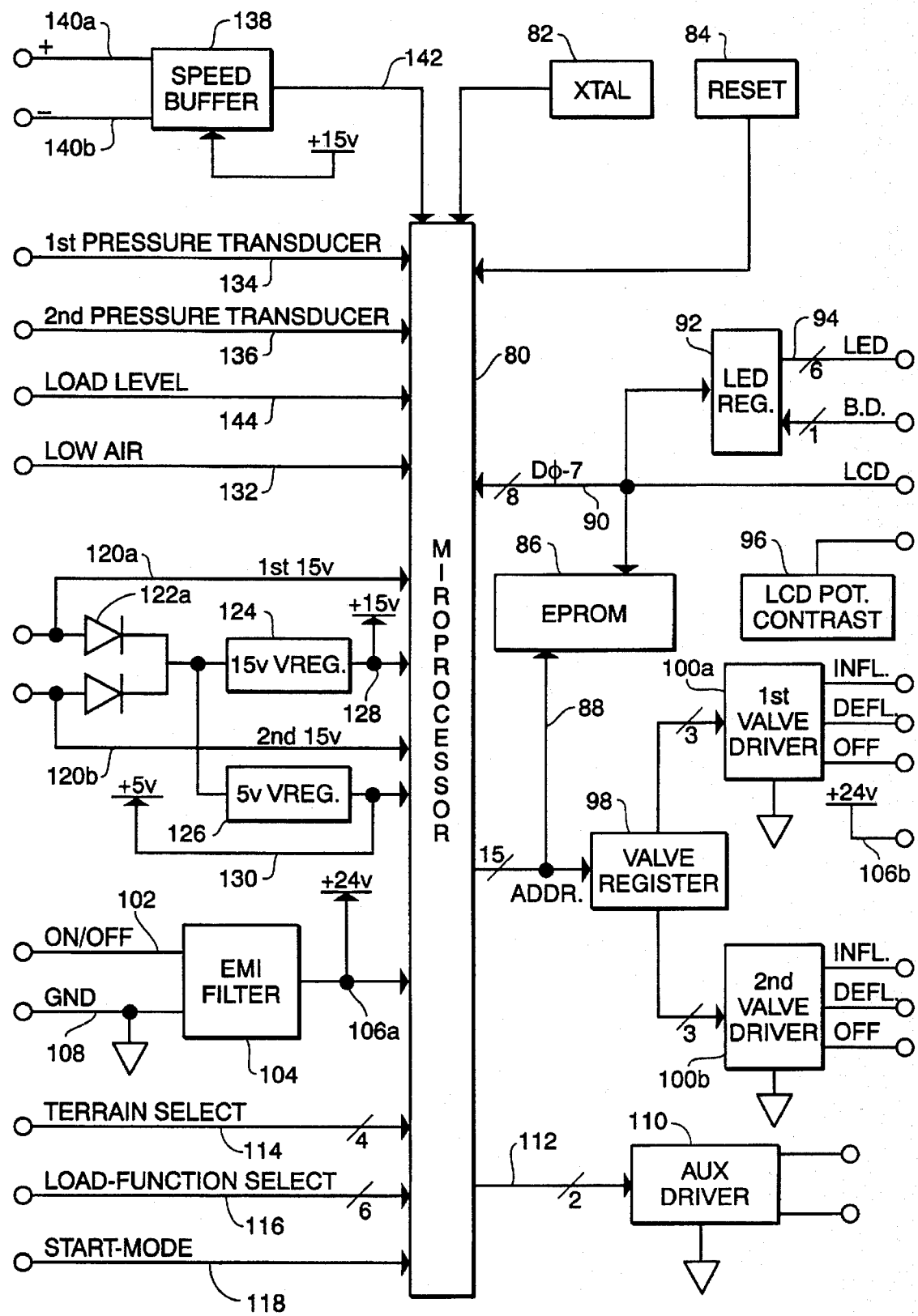
FIG. 3 is a schematic diagram of a programmable cab-mounted controller electronic circuit.
Figure 4:
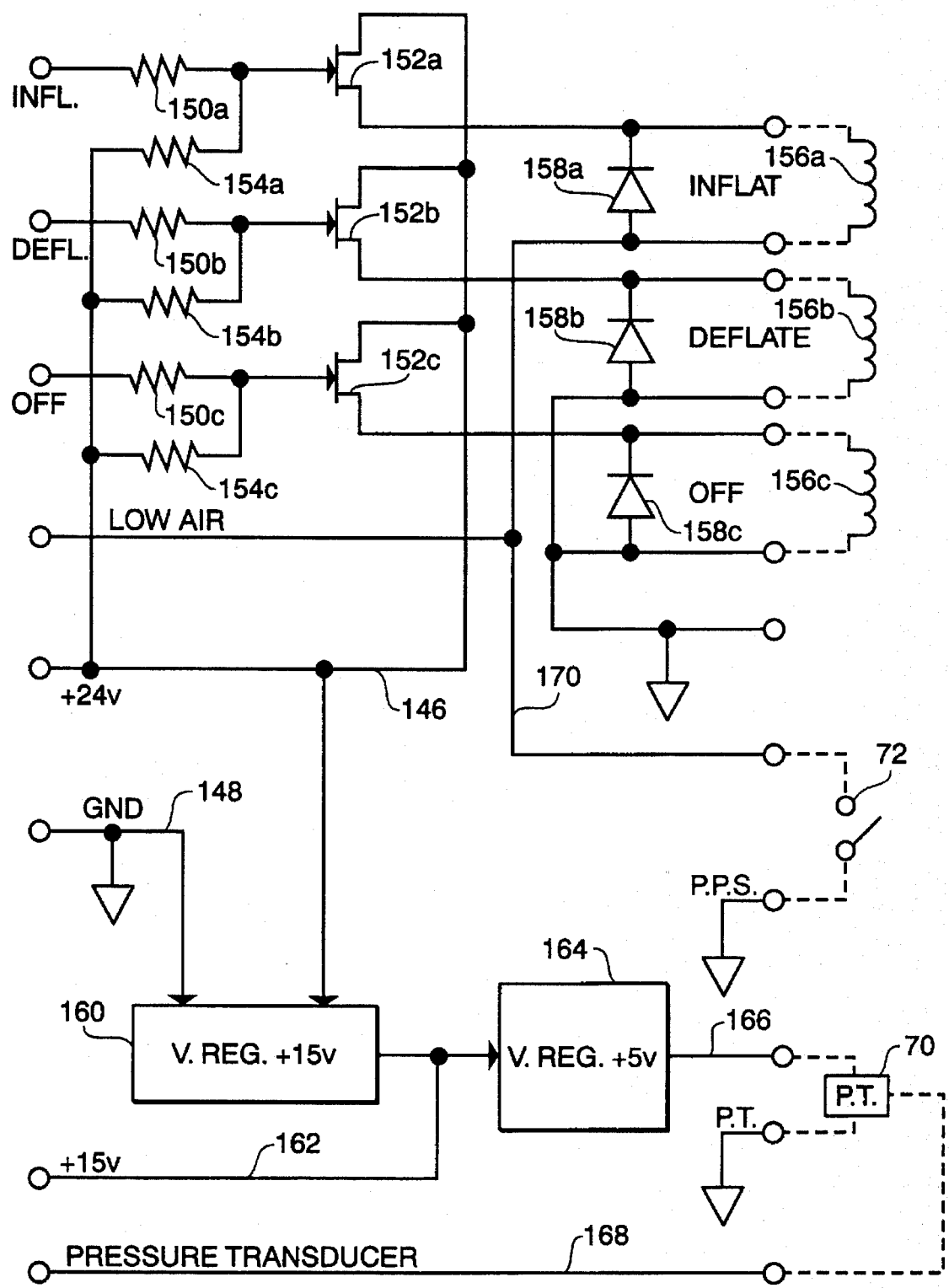
FIG. 4 is a schematic diagram of a manifold electronic circuit.

Referring to FIGS. 2, 3 and particularly 4, the manifolds 42 preferably receive the filtered 24V signal on line 106 supplied by the controller 40, but could alternative receive 24V power directly from the battery ignition source 43. The 24V power one line 146 and ground on line 148 supply power to the manifold electronic 52. The inflation, deflation and hut off outputs of the valve drivers 100 are routed to the manifold 42 and more particularly respectively to gate resistors 150a, 150b and 150c, used for respectively turning on FETs 152a, 152b and 152b, respectively using pull up resistors 154a, 154b and 154c, which are pulled up to the 24V line 146. The FETs 152a, 152b and 152c respectively control an inflation solenoid 156a, a deflation solenoid 156b and a shut off solenoid 156c, of the inflation valve 54, deflation valve 56 and shut off valve 58, respectively. FETS 152a, 152b and 152 are respective connected to protection diode 158a, 158b and 158c which are respectively connected in parallel to solenoids 156a, 156b and 156c.

The 24V volt power line 146 is also connected to a 15V voltage regulator 160 providing a 15V power signal on line 162 which is routed back to the controller 40 through cable 47 onto line 120. The 15V regulated power signal on line 162 is also routed to a 5V regulator 164 which provide a regulated 5V reference voltage on line 166 routed to the pressure transducer 70 which is also provided a reference ground line. The pressure transducer 70 provides a pressure transducer signal on line 168 which is communicated to the controller 40 through cable 47 onto line 134 or 136. The 15V regulator 164 may be a LM317TB device. The 5V regulator 164 may be a LM78L05 device. In the first manifold 42a, the pressure transducer signal on line 168 is routed to line 134 of the controller 40. In the second manifold 42b, the pressure transducers signal on line 168 in routed to line 136. In the first manifold 42a, the priority pressure switch 72, which is a normally closed switch, is preferably connected through line 170 to inflation solenoid 156 for conducting current when the inflation solenoid is actuated by operation of FET 152a. Line 170 when high indicating low air prevent current flow through solenoid 156a to prevent actuation of the inflation 54 to conserve the air supply 44. Line 170 is also routed through cable 47a to the controller 40 and onto line 132. The controller 40 also deactivates the solenoid 156 using valve drivers 100 and FET 152a, and could deactivate the inflation solenoid 156a by first sensing the low air signal on line 132 and then deactivating the solenoid 156 to prevent further inflation in the presence of low air.

Referring to all of the Figures and particularly FIGS. 5a, 5b, 5c and 5d, intelligent process control of the controller 40 is shown by way of exemplar flow charts. Those skilled in the art recognize that various differing process flows can achieve the same equivalent functional result. The intelligence of the system lies in executed programs stored in EPROM 86. The controller 40 provides functional control including desired pressure selection, over speed detection, programmability, display panel sensing and control for operator interaction, function and pressurization parameter storage and manifold control for pressure sensing and maintaining desired pressures, among others functional control features.

The controllers 40 is preferably field programmable to change and update desired pressures, functions and parameters. For each operating condition, typically specified by a combined load and terrain selection, e.g. Half loaded on Highway, the display controller 40 maintain a desired pressure, e.g. 45 PSI, respective speed limit for all or each of the air channels, that is, for all or each of the sets of tires 50. The display controller 40 maintains in EPROM 86 a table of desired pressures and speeds. The EPROM 86 also stores a set of functions and timer values. The functions and timers, in the preferred form of the invention, include five functions such as Power Up Timer function and Power Up Timer value, Restart function and Restart Timer value, Over Speed Limit function and Over Speed Limit Timer value, Speed Increment function and Speed Increment Timer value, and Run Flat function and Run Flat Timer value. These functions and timer values are preferably field programmable.

The controller 40 also uses a set of parameters for maintaining desired pressures. These parameters are also field programmable. In the preferred form of the invention the parameters include a gross pressure band A and a fine pressure band B for each desired pressure, inflation offset value and deflation offset value for each desired pressure, a static delay time, a low air supply pressure value and a flat pressure value. While these few preferred parameters are preferably used, system configurations and manifold means for controlling air pressure may give rise to differing sets of parameters. The low air pressure, flat tire pressure, pressure bands A, pressure band B, static delay time and offset values are preferably common to most systems. Further, the controller 40 may use initial default parameters or updated parameters.

In addition to these preferred parameters, other micro control parameters could be also preferably used for micro pressurization control depending on the type and configuration of the system. For example, when sensing static pressures or dynamic pressures during an adjustment cycle in a wheel valve system when the wheel valves 48 are shut off, the controller 40 could use parameters indicating an inflation pulse time to open the wheel valves 48, and then wait an inflation delay time to then thereafter measure the air pressure to then again shut off the wheel valve 50 or to continue an inflation or deflation adjustment cycle. For another example, a parameter could specify a number inflation pulses that are used at the beginning of adjustment cycle to open the wheel valves 48. When sensing initial air pressure in a wheel valve system during a flat tire condition when the wheel valves 48 are shut off, the controller 40 could use a parameter which indicates a flat tire inflation pulse time and then wait a flat inflation delay time to then thereafter measure the air pressure to then again shut off the wheel valve 48. When actuating the gate 74 having a port valve seal, not shown, the controller 40 could use a parameter indicating the number of inflation pulses to ensure sealing the port valve. While these micro control parameters are particular to a system within the scope of the present invention, not all possible parameters are discussed in detailed.

The system uses a dynamic the offset method. The offset values adjust the desired pressure to a target pressure which is used to terminate a pressure adjustment cycle. After waiting a stabilization time period, a static pressure is measure. The static pressure is subtracted from the target resulting in a new off value which is stored and used during the next pressure adjustment cycle. There is preferably an offset value for each operating condition, that is for each desired pressure, for example forty-five PSI for highway and unloaded. There is preferably an offset value used for inflation and a respective one used for deflation. The offset values are updated and stored for maintaining a current dynamic offset look up table. Initially, the desired pressure equals the target pressure because the offset values may be preferably equal to zero. The offset values may also to set to an initial default values. The offset values are preferably stored in the EPROM 86 which would store these values during the life of the system even when power is interrupted. The offset values are dynamic and adjust for changing dynamic characteristic such as caused by long term wear, temperature, altitude, and transducer variance. In this manner, the controller 40 functions to pressurize the air channel to desired pressures based upon operating conditions even during changing system characteristics.

Figure 5A:
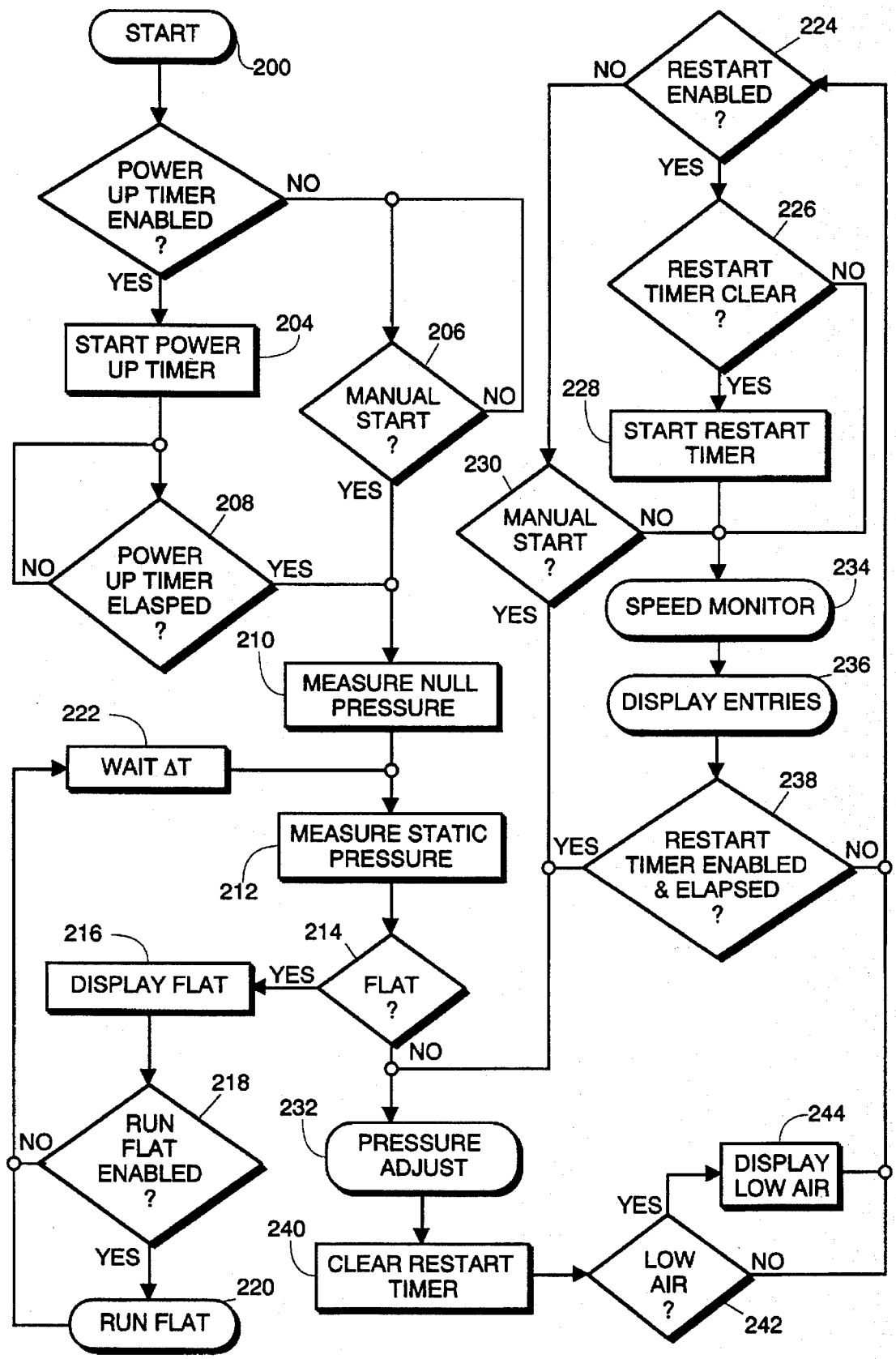
FIGS. 5A, 5B, 5c and 5d are flow charts of the programmable cab mounted controller.

Referring to particularly to FIG. 5A, the controller 40 start 200 upon ignition of the vehicle which supplies power to the system. If the power up timer function is enabled 202 the power up timer is started 204, if not the system waits 206 for a depression of the start button 16. If the power up timer has been started 204 the controller 40 waits 208 until the power up timer 204 has elapsed. The power up timer may be set in increments of one second from five to one hundred seconds. When either the power up timer has elapsed or the start button 16 has been depressed 206, the controller 40 measures the null pressure 210 by and then measures the static pressure 212.

If an air channel 46 is flat 214, the display panel 10 indicate a flat condition by having the low air LED 17 continuously on and may display 216 the flat tire pressure on the display 12. If the fun flat function is enabled 218 then a run flat system runs flat 220. In either case, when the run flat timer is elapsed 222 and the system again measures 212 the static pressure. The run flat function 220 is executed 52 to provide flat tires with a periodic inflation time to maintain some air inflow. In the case of a air channel or tire slow leak, the tires 50 may be inflated to near normal operating conditions for substantial periods of time so the vehicle could run flat until the flat tire condition can be repaired.

The controller 40 uses the restart function to periodically check and maintain tire pressure to desired pressure. Very small air leaks or changing conditions such as wear and temperature can cause the air pressure to change resulting in a need to periodically check and maintain the tire pressure. The restart function is used to periodically check and adjust the tire pressure. If the restart function is enabled 224 and the restart timer has been cleared 226 indicating that a pressure adjustment cycle has recently completed, then the restart timer is started 228 which indicates the time between pressure adjustment cycles. The restart time is preferably set between three and one hundred minutes in one minute increments. If a manual start has been entered 230, a pressure adjustment cycle 232 process is executed. If a manual start has not been entered 230, then speed monitoring 234 and display entries 236 processes are executed. If the restart timer has elapsed 238, then a pressure adjustment 232 is executed. If the restart timer has not elapsed then the restart enabled function is checked again 224. After a pressure adjustment cycle 232, the restart timer is cleared 240 and low air is checked 242. If a low air condition is present 242, a low air indication is displayed 244, if not, the restart enabled function is check again 224. Low air pressure is preferably eight-five PSI.

The system is started 200 by first switching the toggle switch 14 to the "on" position. Process loops of the power up timer 208 and manual start 206 may have subroutine jumps to display entries routine 236. During the loops 208 and 206, the signal LED corresponding to the indicated position of rotary switch 18 will then light up and blink during the power up timer 208 or until a manual start 206. During the power up timer 204 or manual start loop 206, the rotary switches 20 and 18 may be turned to new positions and the start button pushed to commence the operation after the power up timer or manual start depression resulting in pressure adjustment 232 of tire pressure selected by the operator.

Figure 5B:
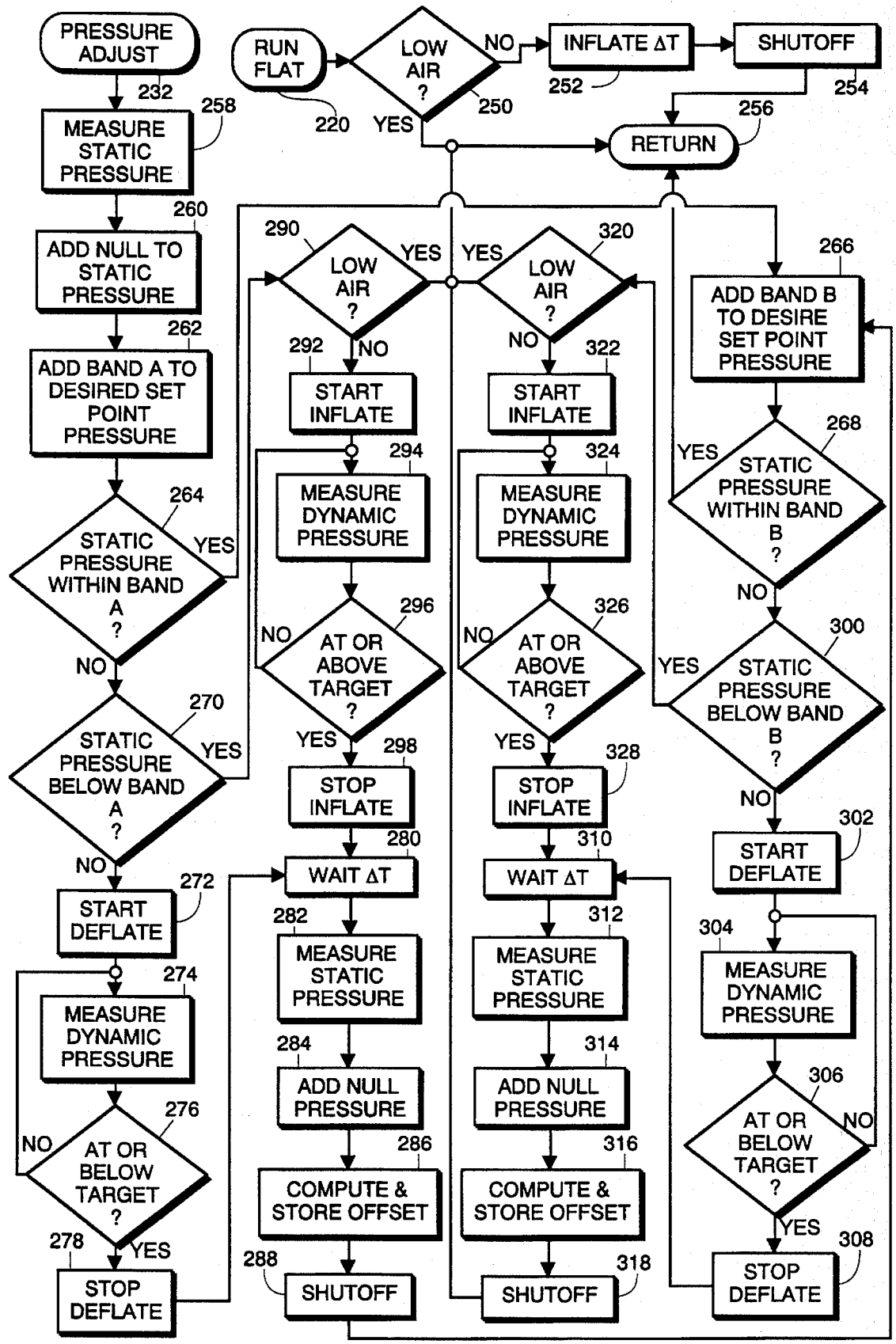

Referring to FIG. 5B, the run flat process 220 is used to provide an air flow into a leaking air channel or flat tire during a run flat condition enabled by the run flat function. Upon initiation of the run flat process 220, a low air condition is determined 250. If the supply air source is not low, then the inflation valve is opened 252 to supply air into the identified air channel for a run flat time of the stored ran flat time parameter. After the inflation time 252, the shut off valve is opened 254 to closed the air channel 46 in the wheel valve system. After the shut off 254, the run flat process returns 256. If a low air condition is determined 250, the process returns 256 without inflation 252 in order to conserve the air supply.

During the pressure adjustment cycle 232, the desired pressure is adjusted by offsets, which are subtracted in the case of deflation and added in the case of inflation resulting in the target pressure. As the tire pressure is being increased or decreased, the sensed changing air pressure is a dynamic pressure value. After an inflation or deflation adjustment at a closed loop point when the dynamic pressure equals the target pressure and after a stabilization period, the air pressure is stabilized and considered a static pressure. The difference between the target pressure and the static pressure is the new offset value which replaces the old offset value.

When a pressure adjustment cycle is initiated 232, the static pressure is measured 258 and adjusted with the null pressure 260. The gross band A is added 262 to the desired pressure to provide an acceptable band of pressure. The static pressure is compared 264 to the pressure band A, that is, if the static pressure is within a band of pressure above or below the desired set point pressure. The band A and band B are preferably between 0.5 PSI and 8.0 PSI in 0.5 PSI increments. If the static pressure is within the band A centered about the desired pressure, that is, the desired pressure band, then the fine pressure band b is added 266 to the desired pressure. If the static pressure is within the fine band B 268 centered at the desired pressure, then the pressure adjustment cycle is terminated at return 256. Thus, if the static pressure is within both band A 264 and band B centered at the desired pressure, then no air pressure adjustment is preformed.

If the static pressure is not within band A 264, then it is determined 270 if the static pressure is below desired pressure band A. If the static pressure is not below desired pressure band A, then deflation is initiated 272. The dynamic pressure is periodically measured 274 to determine 276 when the dynamic pressure reaches the target pressure. The target pressure during deflation is the desired pressure minus a deflation dynamic offset value. When the dynamic pressure reaches the target pressure 276, deflation is terminated 278 followed a wait time period 280 to stabilize the air pressure within the tires and air channel. The stabilization time allows equalization of the pressure among the tires connected to an air channel. Equalization may take a few seconds. After the stabilization time period 280, the static pressure is measured 282 and null adjusted 284. A new dynamic deflation offset value is computed and stored 286, and, in the case of wheel value system, the wheel valves are shut off 288. The flow then continues to add band B 266 to the desired pressure and determined if the static pressure is within desired pressure band B 268.

If the static pressure is below desired pressure band A, low air is check 290 prior to initiating inflation 292. If low air is sensed 290 the process returns 256 without inflation 292 to conserve the air supply. During inflation 292, the dynamic pressure is periodically measured 294 to determine 296 when the dynamic pressure reaches the target pressure. The target pressure during inflation is the desired pressure plus a dynamic inflation offset value. When the dynamic pressure reach the target pressure 296, inflation is terminated 298 followed by the wait time period 280 to stabilize the air pressure within the tires and air channel. As with deflation, after the stabilization time period 280, the static pressure is measured 282 and null adjusted 284. A new dynamic inflation offset value is computed and stored 286, and, in the case of wheel value system, the wheel valves are shut off 288. The flow then continues to add band B 266 to the desired pressure and determined if the static pressure is within desired pressure band B 268.

If the static pressure is not within desired pressure band B 268, then it is determined 300 if the static pressure is below Band B. If the static pressure is not below the desired pressure band B, then deflation is initiated 302. The dynamic pressure is periodically measured 304 to determine 306 when the dynamic pressure reached the a target pressure. The target pressure during deflation is again the desired pressure minus a dynamic deflation offset value. When the dynamic pressure reaches the target pressure 306, deflation is terminated 308 followed a wait time period 310 to stabilize the air pressure within the tires and air channel. After the stabilization time period 310, the static pressure is measured 312 and null adjusted 314. A new dynamic deflation offset value is computed and stored 316, and, in the case of wheel value system, the wheel valves are shut off 318, and the pressure adjustment cycle terminates by return 256.

If the static pressure is below the desired pressure band B, low air is check 320 prior to initiating inflation 322. If low air is sensed 320 the process returns 256 without inflation 292 to conserve the air supply. During inflation 322, the dynamic pressure is periodically measured 324 to determine 326 when the dynamic pressure reaches the target pressure. The target pressure during inflation is the desired pressure plus a dynamic inflation offset value. When the dynamic pressure reach the target pressure 326, inflation is terminated 328 followed by the wait time period 310 to stabilize the air pressure within the tires and air channel. As with deflation, after the stabilization time period 310, the static pressure is measured 312 and null adjusted 314. A new dynamic inflation offset value is computed and stored 316, and, in the case of wheel value system, the wheel valves are shut off 318, and the pressure adjustment cycle terminates by return 256.

The selected LED 22, 24, 26 or 28 corresponding to the current operating condition blinked during a pressure adjustment 274, 294, 324 and 304. The selected LED referenced by switch 18 may continue to blink until the current pressure adjustment has been completed at return 256. The selected LED then remains lit after the shut off to provide a reference for the last completed pressure adjustment cycle.

The above pressure adjustment cycle is characterized by a gross pressure adjustment using band A, a fine pressure adjustment using band B, a null adjusted static pressure, an absolute shut off when the dynamic pressure equals a target pressure, a target pressure equal to a desired set point pressure adjusted by an offset value, a wait period for air pressure stabilization prior to measuring the static pressure after inflation or deflation, and an updated dynamic offset value recomputed after each inflation or deflation. The system updates the dynamic offset values after the stabilization time period to account for settling times and to continually update to the dynamic offset values to account for dynamic changes of the system.

In the preferred form, for each desired pressure, for each air channel, there is an inflation and deflation dynamic offset value. In an alternate form of the invention, there is an offset value for each band A and band B. In the preferred form, there is one stabilization time period. In an alternate form of the invention, there is a wait time period for inflation or deflation, for each band A and band B, and for each air channel. The stabilization period is preferably between 0.5 and 8.0 second set in 0.5 second increments. The desired pressures are set between five PSI and sixty PSI in one PSI increments, increments for each operating condition, load level condition and air channel.

Figure 5C:
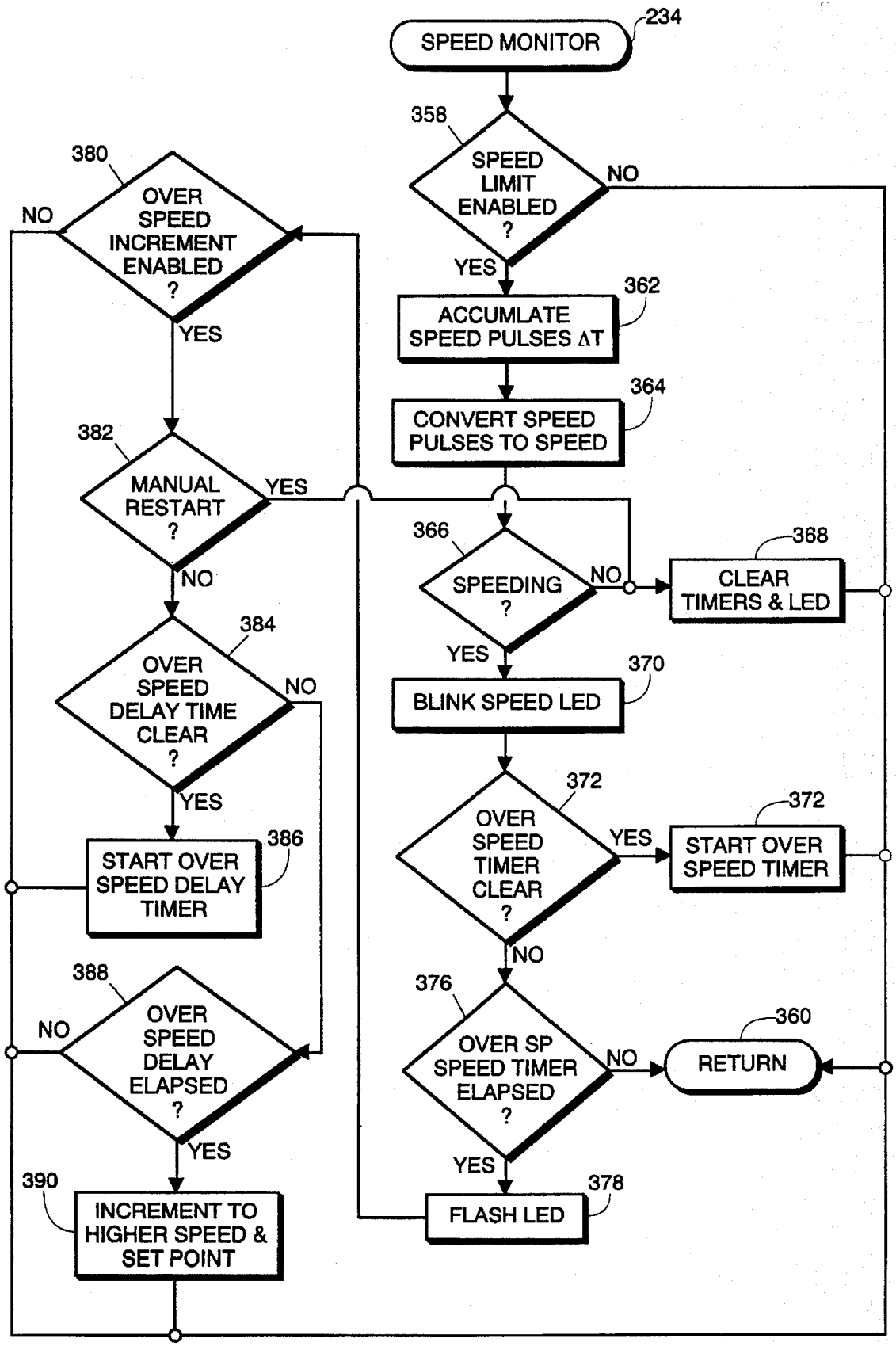

Referring to FIG. 5c, the speed monitoring process 234 first determines if the speed limit function is enabled 358. If not, the speed monitoring process returns 360, otherwise the speed pulses from a vehicular speed transducer, not shown, are accumulated 362 for an speed pulse accumulation time which is preferably two seconds, but which may be one to sixty seconds in one second increments. The accumulated pulses are converted 364 to speed by a pulse to MPH conversion multiplier which is typically seven but could vary depending upon the type of speed transducer used. After the speed is determined 364, the speed is compared 366 to the current speed limit. Preferably, each desired pressure has a respective speed limit. The speed limits may be set between five MPH and seventy MPH in one MPH increments. Preferably there is a speed limit and respective desired pressure for each operating conditions.

The over speed limit process uses two timers, an over speed limit timer and an over speed increment delay timer, and controls the over speed LED 30. If the vehicle is not speeding 366, the timers and LED are cleared 368 indicating a safe operating speed. If the vehicle is speeding 366, the speed LED is blinked 370 to indicate to the operator that an over speed limit condition exists. The operator can reduce vehicular speed to clear 368 the over speed condition. The over speed timer is used to determine if an over speed condition has existed for an over speed limit time period. The over speed time period can be one to sixty second in one second increments, preferably set at five seconds. It is first determined 372 if the over speed limit timer has been cleared 368, and if so then the over speed limit timer is started 374 followed by a return 360. If the over speed limit timer has not been cleared, and the over speed timer had already been started 374, then it is determined 376 if the over speed limit timer has elapsed, and if not then a return 360. If the over speed limit timer has elapsed 376, the over speed limit LED is flashed 378, that is blinked for an extended duration, to indicate to the operator that the vehicle has been exceeding the speed limit for more that the over speed limit timer, and that an increase in speed limit and corresponding increase in the desired pressure may occur after the over speed increment delay time. The over speed increment delay time can be one to sixty seconds in one second increments, preferably set at forty-five seconds.

The speed monitoring process then determines 380 if the over speed increment function is enabled. If not, the process returns 360, and if so, the process then determines 382 if a manual restart has been entered by the operator by pressing the start button 16. If a manual restart has been entered 382, the timers and over speed LED of the speed monitoring process are cleared, effectively resetting the over speed monitoring process. The manual restart enables an operator to manually bypass an automatic increment of the speed limit and change of the desired pressure even when the automatic increment function is enabled and the operator continues to exceed the current speed limit. If the manual restart has not been entered 382, then it is determined 384 if the over speed delay timer has been cleared, and if so, then the over speed increment delay timer is started 386. If not, then it is determined 388 if the over speed delay timer as elapsed. If not, the process returns 360. If the over speed timer has elapsed, then the desired set point pressure is increased 390 resulting in an increased speed limit. The over speed delay timer in the over speed increment function is used to automatically increment the speed limit by increasing the respective desired pressure due to operating the vehicle in an over speed condition for an extended period of time. During the next pressure adjustment cycle, the tire pressure will be increased to the new desired pressure resulting in a new increase speed limit. In this manner, tires are operated at the correct pressure for the current vehicular speed. The speed monitor process 234 monitors only speed, but could modified to also monitor load levels which could be used to adjust the current speed limit.

Figure 5D:
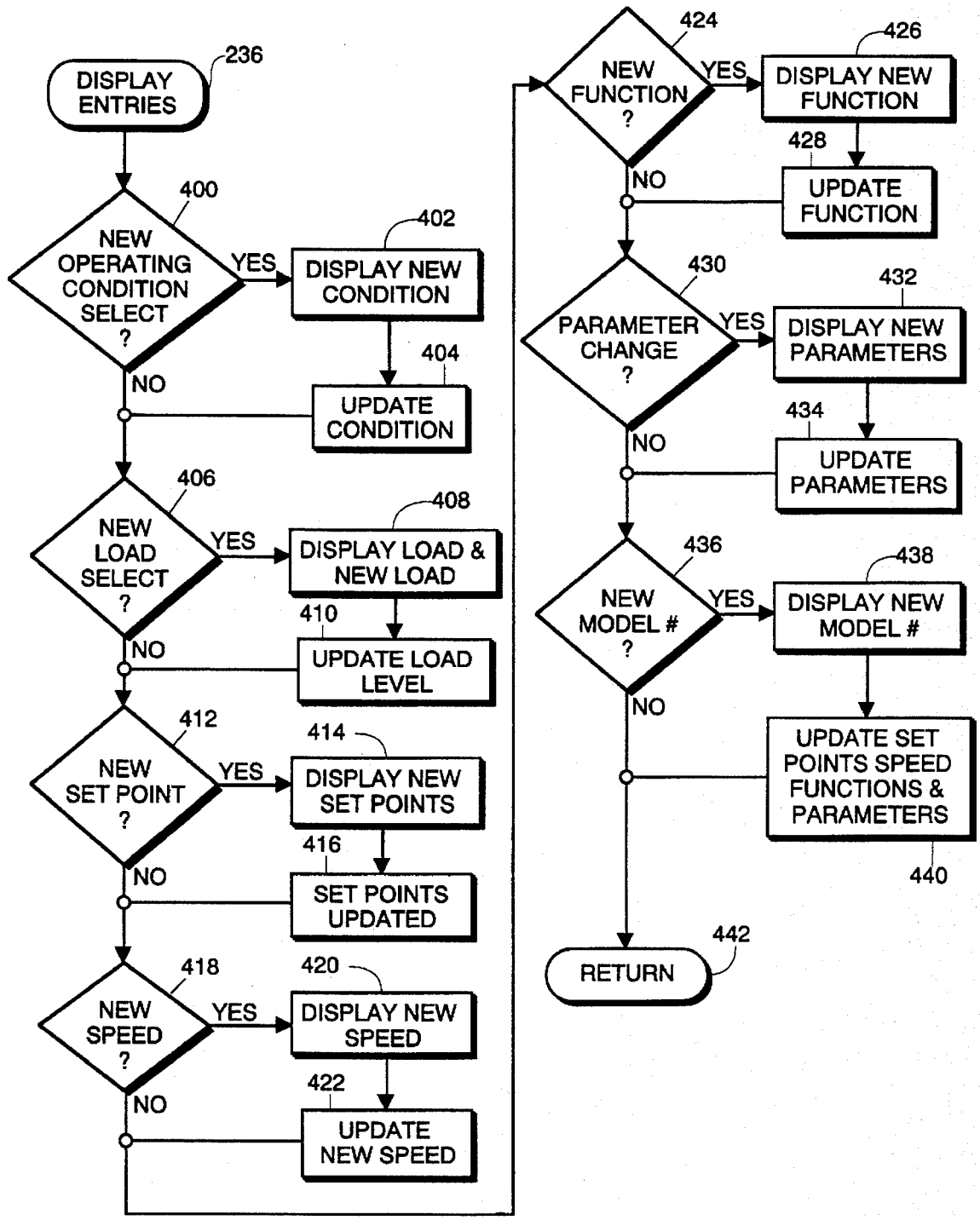

Referring to FIG. 5d, the display entries process 236 is used to process the selection of a new operation condition, e.g. Highway, new load level conditions, e.g. full, new function, e.g. restart, and new parameters, e.g. pressure band A. The process determines 400 if a new operating condition has been selected. This could be by way of operator selection or by automatic control, for example, during an over speed limit condition. If a new operating condition has been selected, it may be displayed 402 for operator convenience. The memory 86 is also updated 404 with the new condition. Then, the process determines 404 if a new load level condition has been selected, and if so, it may be displayed 406 for operator convenience. The memory is also updated 410 with the new load level operating condition. If a new desired pressure has been selected or entered 412 by either operator selection of a new operating condition, by operator entry of a new load level condition, or by automatic control, the new desired pressure is displayed 414. The memory is updated 416 with the desired set point pressure. During the next pressure adjustment cycle, the tire pressure will be adjusted to the new desired set point pressure for the current operating condition and load level condition.

It is determined 418 if a new speed values has been entered 418. If so, the new speed value is displayed 420 and stored in the display controller memory. It is determined 424 if a new function has been enabled or disabled by operator entry. If so, the new function is displayed 426. The memory is updated 428 with the new state of the function. During the next use of such function in its new enabled or disabled state, that change will be used. It is determined 430 if a parameter has been changed 424 by operator entry. If so, the new parameter is displayed 432. The new parameter is stored in the memory. The parameters include desired pressures, speed limits, function timers, offsets, pressure bands, run flat inflation time, low air pressure, flat tire pressure, among many other possible parameters stored in the memory. It is determined 436 is a new vehicular model number has been entered. If so, the model number is displayed 438. The new model number is referenced to data stored in reserve areas of memory. The data may include a new set of desires pressures, new speeds limits, new functions, new function timers and new parameters which are stored in the memory as current values. After updating new condition, desired pressures, speed limits, functions, and parameters, the process returns 442.

Referring to FIG. 1a and 5d, operator selection and entry of new conditions, desired pressures, speed limits, functions, parameters and models are perfected by used of the panel 10. Even though the panel 10 for example has a limited number of buttons and switches 13, 14, 16, 18, 20, 22, 24, 26, sequences of depressions of the buttons and switches can be used to change the conditions, desired pressures, speed limits, functions, parameters and models. For example, the start mode select button 16 may be depressed while the function A is selected to select options including terrain, load, desired pressures, air channel, vehicle model number, parameter, function and function timer. Function switches A, B and C and the mode button 16 are then used for incrementing, decrementing and scrolling through the options and entering values. The display serve as visual feed back to operator for visual verification of selection option and entered values. The display would show the option and parameter being field updated. The above preferred embodiments may be enhanced or modified by those of skilled in the art. Those enhancement or modification may nonetheless fall within the spirit and scope of the following claims.

What is claimed is:

1. A system in a vehicle for adjusting respective tire air pressures in one or more respective sets of tires from an air supply, said system comprising, a controller means comprising memory means for storing programs and data, processor means executing said programs using said data, communication means for communicating signals used for adjusting said respective tire air pressures to said respective desired pressures, panel means for selecting said respective desired pressures and entering entered data, said memory means comprising rewritable non volatile for storing said entered data and for updating said data, respective manifold means comprising respective electronic means for communicating said signals and for adjusting said respective tire air pressures to said respective desired pressures, respective inflation means for supplying supply air from said air supply to said respective sets of tires, respective deflation means for exhausting air from said respective sets of tires, and respective air pressure sensors for sensing said respective tire air pressures in said respective sets of tires, and respective air channel means connected between both of said respective inflation means and said respective deflation means to said respective sets of tires for communicating said supply air to said respective sets of tires, for communicating said exhaust air from said respective sets of tires, and for communicating said respective tire air pressures to said respective air pressure sensors.

2. The system of claim 1 wherein said entered data comprises sets of said respective desired pressures respectively for a plurality of operating conditions and said panel means further for selecting one of said plurality of operating conditions to select one of said sets of respective desired pressures.

3. The system of claim 1 wherein said system has the same plurality of said respective manifold means, respective air channel means and respective sets of tires, said data comprises respective sets of said respective desired pressures respectively for a plurality of operating conditions and said panel means further for selecting one of said plurality of operations conditions for selection one of said sets of respective desired pressures.

4. The system of claim 1 wherein said system said respective manifold means is one gating manifold, said system further comprises, gating means for communicating said supply air and said exhaust air between said one gating manifold and said respective air channel means, said gating further connected to and controlled by said manifold electronic means for routing one at a time said respective air channel means to said one gating manifold.

5. The system of claim 1 wherein said respective manifold means further comprise respective shut off means controlled by said respective manifold electronic means for evacuating said respective tire air pressures from said respective air channel means, said system further comprises, respective wheel valve means respectively connected between said respective air channel means and said respective sets of tires, said respective wheel valve means for communicating said supply air respectively to said respective sets of tires during inflation, for communicating said exhaust air respectively from said respective sets of tires during deflation, and for shutting off air communication respectively to and from said respective sets of tires when said respective air channel means is evacuated.

6. The system of claim 1 wherein said entered data comprises speed limit data and said controller further comprises, speed detection means connected to said vehicle for sensing vehicular speed, said panel means for selecting one of a plurality of operating conditions each of which for selecting said respective desired pressures and for selecting a speed limit of said speed limit data, said processor means for determining when said vehicular speed exceeds said speed limit.

7. The system of claim 1 wherein said entered data further comprises respective stabilization time periods and respective offset values added to said respective desired pressures providing respective target pressures for controlling said respective inflation means and said respective deflation means for adjusting said respective tire air pressures until said respective tire air pressures reach said respective target pressures sensed by said respective air pressure sensors, said processor means for waiting said respective stabilization time periods for sensing respective static pressures by said respective air pressure sensors and for recomputing said respective offset values equal to said respective target pressures minus said respective static pressures.

8. The system of claim 1 wherein said entered data comprises respective parameter values for controlling the operation of said respective inflation means and said respective deflation means for adjusting said respective tire air pressures to said respective desired pressures.

9. The system of claim 1 wherein said system is further for controlling functions, said entered data comprises function data, and said panel means is for entering said function data stored in said rewritable non volatile memory means, said function data read by said processor means for enabling said functions.

10. The system of claim 9 wherein said system further comprises speed detection means connected between said vehicle and said processor means for sensing vehicular speed, said functions comprise over speed detection, over speed adjustment, power up start adjustment, restart adjustment, low air detection and flat tire detection, said function data further comprises, speed limits, said panel means for selecting one of a plurality of operating conditions for respectively selecting one set of said respective desired pressures and for selecting one of said speed limits, said processor means for determining when said vehicular speed exceeds said speed limit, over speed data for detecting over speed conditions and for automatically adjusting said air tire pressure to another of said respective desired pressures, automatic power up start data for automatically starting pressure adjustments of said tire air pressure, automatic pressure adjustment restart data for automatically periodically readjusting said respective tire air pressures, low air value for determining when said air supply is low and for disabling inflation pressure adjustments by said inflation means to conserve said air supply, and flat tire value for determining when said respective sets of tires are flat and for periodically providing said air supply for predetermined periods of time.

11. The system of claim 1 wherein, said system is also for model number selection, and said entered data comprises vehicular model numbers each of which for selecting one of a plurality of groups of said respective desired pressures, one of said vehicular model numbers corresponding to said vehicle and one group of said respective desired pressures.

12. A method for adjusting respective tire air pressures to respective desired pressures in a vehicle comprising one or more respective sets of tires, respective air channels, an air supply, a controller comprising rewritable non volatile memory for storing entered data and a panel for entering said entered data, and respective manifolds for inflating, deflating, and sensing said respective tire air pressures, said method comprising the steps of, storing sets of desired pressures respectively referenced to operating conditions, storing said entered data in said rewritable non volatile memory for adjusting said respective tire air pressures, selecting one of said operating conditions so as to select one of said sets of desired pressures, sensing respective static pressures of said respective tire air pressure in said respective air channels, determining if said respective static pressures are above or below said respective desired pressures, inflating said respective tire air pressures to said respective desired pressures when said respective static pressures are below said respective desired pressures, and deflating said respective tire air pressures to said respective desired pressures when said respective static pressures are above said desired pressures.

13. The method of claim 12 wherein said entered data comprises vehicular model numbers, said method further comprises the steps of storing groups of said sets of respective desired pressures, said groups respectively referenced to said vehicular model numbers, and storing into said memory any one of said vehicular model numbers for respectively selecting any one of said groups of sets of respective desired pressures.

14. The method of claim 12 wherein said entered data comprises respective stabilization time periods, said method further comprising the steps of, storing in said memory respective offset values, computing respective target pressures by combining said respective offset values with said respective desired pressures, sensing respective dynamic pressures during said inflating step, sensing respective dynamic pressures during said deflating step, terminating said inflating step when said respective dynamic pressures equal said respective target pressures, terminating said deflating step when said respective dynamic pressures equal said respective target pressures, waiting said respective stabilization time periods, sensing said respective static pressures, computing respective offset values equal to said respective static pressures minus said respective target pressures, and updating said respective offset values in said memory.

15. The method of claim 14 wherein said entered data comprises other respective offset values stored in said memory updating said respective offset values.

16. The method of claim 12 wherein said entered data comprises respective pressure bands, said method further comprising the steps of, adding said respective pressure bands to said respective desired pressures resulting in respective desired pressure bands, determining during said determining step if said respective static pressures are within said respective desired pressure bands, inflating during said inflating step said respective tire air pressures to said respective desired pressures when said respective static pressures are below said respective desired pressure bands, and deflating during said deflating step said respective tire air pressures to said respective desired pressures when said respective static pressures are above said respective desired pressure bands.

17. The method of claim 12 wherein said entered data comprises respective deflation offset values, respective inflation offset values, respective pressure bands, and respective stabilization time periods, said method further comprises the steps of, sensing respective atmospheric null pressures, adjusting said respective static pressures by said atmospheric null pressures, adding said respective pressure bands to said respective desired pressures resulting in respective desired pressure bands, determining during said determining step if said respective static pressures are within said respective desired pressure bands, computing respective target pressures by adding said respective inflating offset values to said respective desired pressures when said respective static pressures are below said respective desired pressure bands, computing respective target pressures by subtracting said respective deflation offset values from said respective desired pressures when said respective static pressures are above said respective desired pressure bands, sensing respective dynamic pressures during said inflation step, sensing respective dynamic pressures during said deflation step, inflating during said inflating step said respective tire air pressures to said respective target pressures when said respective static pressures are Below said respective desired pressure bands, deflating during said deflating step said respective tire air pressures to said respective target pressures when said respective static pressures are above said respective desired pressure bands, terminating said inflating step when said respective dynamic pressures equal said respective target pressures, terminating said deflating step when said respective dynamic pressures equal said respective target pressures, waiting said respective stabilization time periods, sensing said respective static pressures, adjusting said respective static pressures with said respective atmospheric null pressures, storing in said memory said respective inflation offset values equal to said respective static pressures minus said respective target pressures, and storing in said memory said respective deflation offset values equal to said respective static pressures minus said respective target pressures.

18. The method of claim 12 wherein said entered data comprises restart time period, said method further comprises the steps of, waiting said restart time period, readjusting said respective tire air pressures after said restart time period to said respective desired pressures by executing said sensing step, said determining step, said inflating step and said deflating step, and reexecuting continuously said waiting step and said readjusting step.

19. The method of claim 12 wherein said entered data comprises over speed delay time period and speed ranges respectively for said operating conditions, said method further comprising the steps of sensing vehicular speed of said vehicle, determining if said vehicular speed is within one of said speed ranges for said selected operating condition, waiting said over speed delay time period when said vehicular speed is not within said one of said speed ranges, reselecting said selected operating condition to another one of said operating conditions after expiration of said over speed delay time period when said speed is not within said one of said speed ranges, and readjusting said respective tire air pressures to another of said respective desired pressures referenced to said another one of said operating conditions by reexecuting said static pressures sensing step, said desired pressures determining step, said inflating step and said deflating step.

20. The method of claim 12 wherein said entered data comprises sets of said respective desired pressures and wherein said selecting one of said operating conditions selects one of said sets of respective desired pressures stored in said memory.

* * * * *